July 12, 1949.　　　　M. W. BRAINARD　　　　2,475,776
ROTOR FOR DYNAMOELECTRIC MACHINES
Filed Jan. 11, 1947　　　　　　　　　　　　　　2 Sheets-Sheet 1
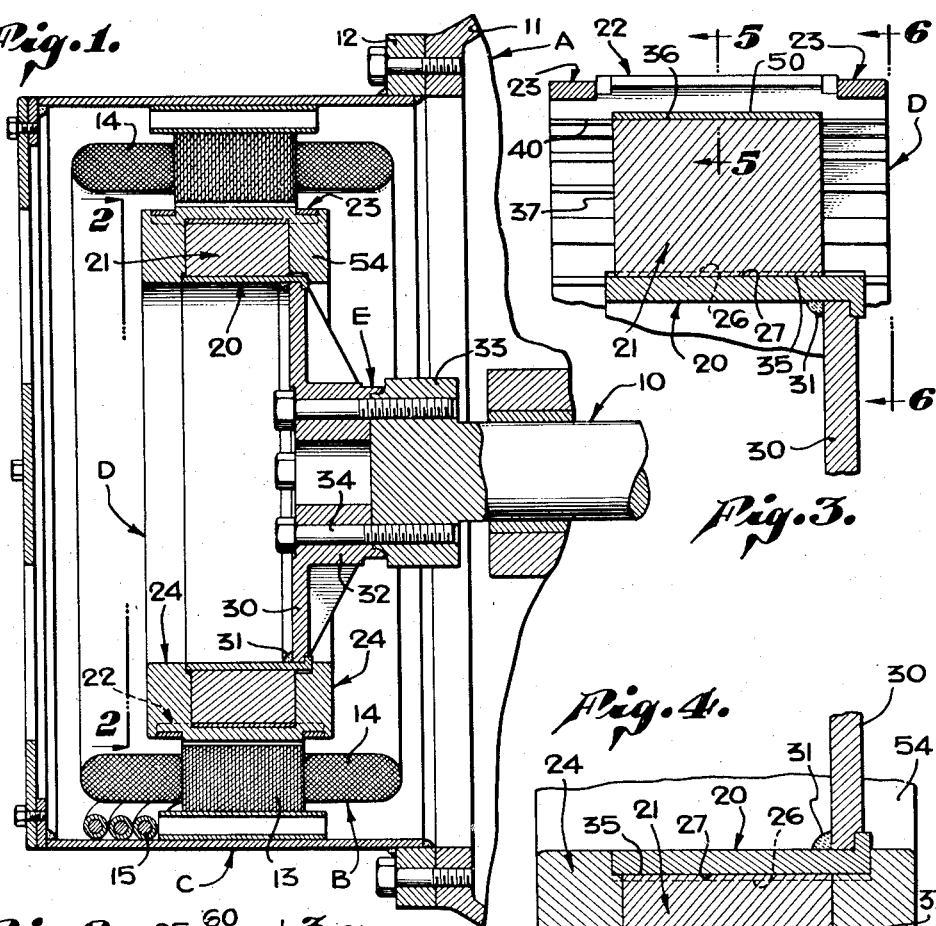
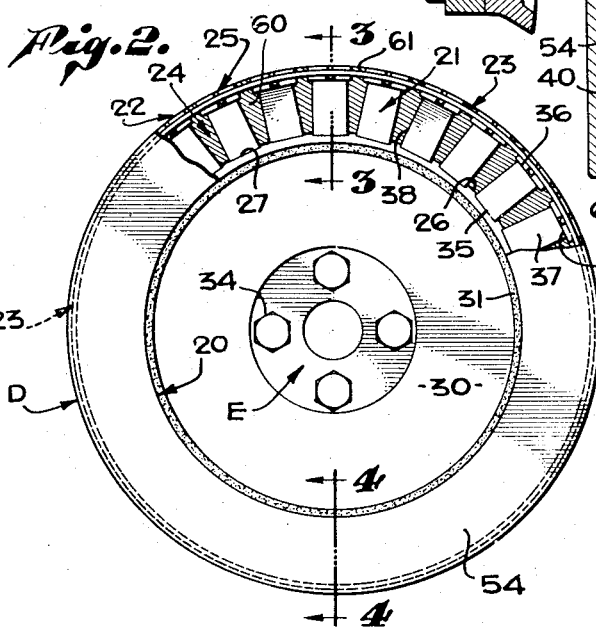
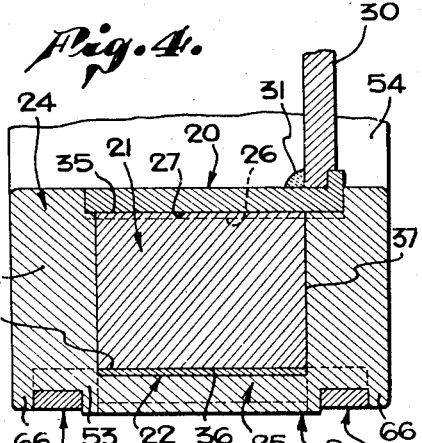
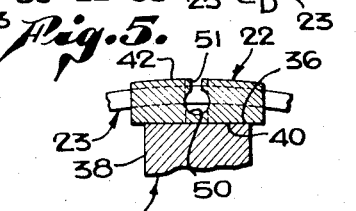
INVENTOR
Maurice W. Brainard
BY
ATTORNEY July 12, 1949.  M. W. BRAINARD  2,475,776
ROTOR FOR DYNAMOELECTRIC MACHINES
Filed Jan. 11, 1947  2 Sheets-Sheet 2
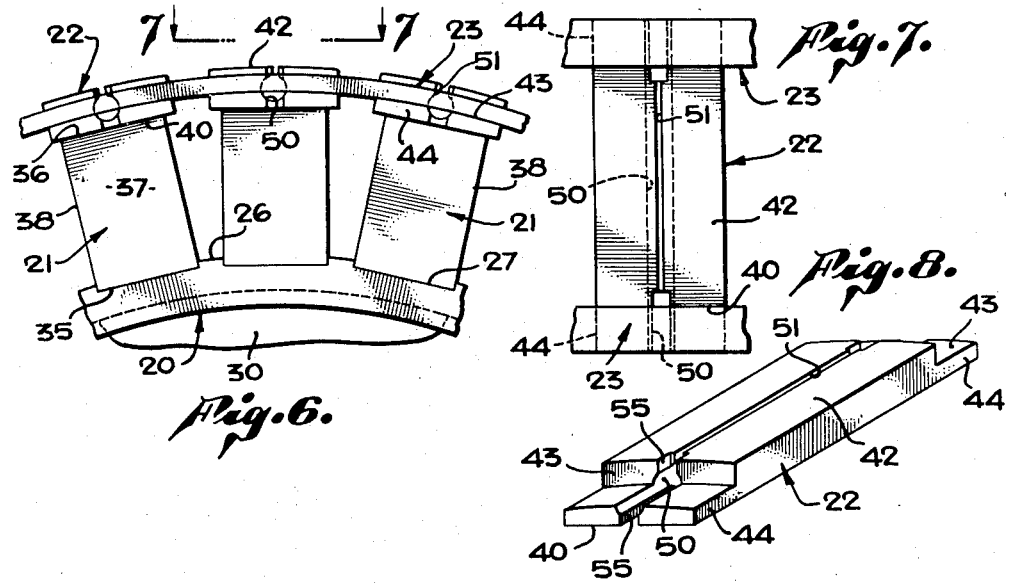
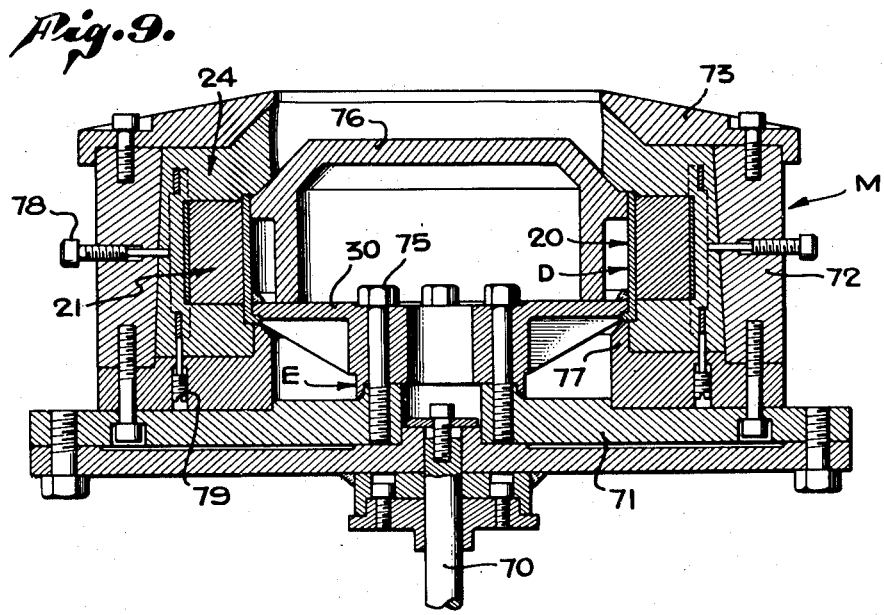
INVENTOR
Maurice W. Brainard
BY
ATTORNEY Patented July 12, 1949

2,475,776

UNITED STATES PATENT OFFICE 2,475,776

ROTOR FOR DYNAMOELECTRIC MACHINES

Maurice W. Brainard, Los Angeles, Calif., assignor of one-half to O'Keefe and Merritt Company, Los Angeles, Calif., a corporation of California Application January 11, 1947, Serial No. 721,528

4 Claims. (Cl. 171—252)

This invention has to do with a rotor and method of making the same and is more specifically concerned with a rotor for electric machines such as motors or generators, it being a general object of the invention to provide a simple, practical, inexpensive rotor construction and a method by which such construction can be easily and economically manufactured.

The rotor provided by the present invention can be used to advantage in motors and generators and it is particularly useful in rotating field type electric machines where permanent magnets are employed to supply all, or part, of the required magnetic field.

Rotors of motors and generators may be operated at high speeds and consequently are subject to centrifugal and other forces tending to deform them. Rotors of the rotating field type involving permanent magnets complicate the problem of design and construction, since the magnets may be a large proportion of the total rotating mass and the most satisfactory magnetic material now available is extremely brittle and cannot be relied upon to withstand appreciable tensile strain.

It is an object of the present invention to provide a rotor of the general character referred to, that is a rotor involving a plurality of permanent magnets, wherein the magnets are positively held or confined by a retainer in the form of an annular band of such character as to effectively resist great centrifugal forces.

It is a further object of the present invention to provide a rotor of the general character referred to wherein the permanent magnets of the rotor are provided with pole pieces engaged by a retainer so that they are positively held in pressure engagement with the magnets.

A further object of the present invention is to provide a rotor of the general character referred to involving generally two annular elements, one a core and the other a retainer between which permanent magnets and pole pieces therefor are confined under pressure.

Another object of the present invention is to provide a rotor of the general character referred to, including a cast body embracing the assembled parts and including damper bars at the pole pieces effective to prevent pole face heating or injury to the permanent magnets in the event of momentary short-circuiting in the machine.

It is a further object of the present invention to provide a method of making a rotor which involves initial clamping of assembled parts onto a core and thereafter heating the assembly and applying a cast body thereto while the structure is expanded to provide a structure wherein all of the assembled parts are tightly seated and the structure is effective in resisting centrifugal force.

The various objects and features of my invention will be fully understood from the following detailed description of a typical preferred form and application of the invention, throughout which description reference is made to the accompanying drawings, in which:

Fig. 1 is a longitudinal sectional view taken through a generator including a rotor embodying the present invention. Fig. 2 is an end view of the rotor taken as indicated by line 2—2 on Fig. 1 with certain parts broken away to show the internal construction. Fig. 3 is an enlarged sectional view of the rotor construction without the body, being a view taken in the direction indicated by line 3—3 on Fig. 2. Fig. 4 is an enlarged detailed sectional view taken as indicated by line 4—4 on Fig. 2. Fig. 5 is a transverse sectional view taken as indicated by line 5—5 on Fig. 3. Fig. 6 is a view taken as indicated by line 6—6 on Fig. 3. Fig. 7 is a view taken as indicated by line 7—7 on Fig. 6. Fig. 8 is a perspective view of one of the pole pieces included in the rotor and Fig. 9 is a view illustrating the assembled parts of the rotor in a mold during the casting of the body.

The rotor construction that I have provided by this invention is useful, generally, in electric machines and for purpose of example I have shown it as the rotor of an electric generator of the rotating field type wherein a plurality of permanent magnets are employed to supply the required magnetic field. In the particular case illustrated the magnets are of limited size and a multiplicity of them is employed in a series around the axis of the rotor. Since the number of magnets determines the frequency of the electric current to be generated at a given revolution per minute of the machine, it is to be understood, that in practice my invention may be carried out in rotors involving any desired number of magnets and the invention is not limited to use in constructions involving magnets of any particular size.

In the drawings the generator involving the rotor of the present invention is shown coupled to a prime mover in the form of an engine A and the generator involves, generally, a fixed element or stator B carried in a suitable case C and a rotor D operating within the stator B and driven from a shaft 10 of engine A through a suitable drive connection E.

The case C of the generator is shown directly connected to the case 11 of the engine by a suitable flange connection 12 and the stator B shown in the drawings involves laminated cores 13 wound with suitable coils 14 connected to the load through suitable lead lines 15.

The rotor D provided by the present invention involves, generally, an annular or drum-shaped core 20 secured to the shaft 10 with a coupling means E, a plurality of permanent magnets 21 seated on the exterior of the core, pole shoes or pole pieces 22 on the outer ends of the magnets, one or more retainers 23 holding the pole pieces on the magnets, and a body 24 cast to the other parts of the rotor and including damper bars 25 at the pole pieces.

The core 20 of the rotor may vary widely in size and shape and in practice is made of such diameter and axial extent as to properly accommodate the series of magnets 21 incorporated in the rotor. In the preferred form of the invention the outer peripheral surface 26 of the core is provided with a plurality of circumferentially spaced seats 27 provided to receive or accommodate the inner ends of the magnets 21. It is preferred that there be a seat 27 for each magnet 21 and that the several seats 27 be equally spaced circumferentially of the core. In the particular case illustrated in the drawings the seats 27 are shown as flat since the inner ends of the magnets 21 are flat. The core 20 is formed of magnetic material so that it acts to magnetically couple the magnets 21 and in practice I prefer to make the core of such thickness or body as to provide an effective magnetic couple between the inner ends of the several magnets 21.

In practice any suitable connection may be provided between the rotor and the prime mover, that is, between the rotor and the shaft 10 of the engine. In the preferred arrangement illustrated in the drawings the core 20 of the rotor is coupled to the shaft 10 and for this purpose a coupling flange 30 is secured to the core 20 as by welding 31 and/or the like, and the flange 30 is provided with a central hub 32 suitable for connection with the flange 33 on the engine shaft 10 through screw fasteners 34 or the like.

The magnets 21 are preferably simple blocks of suitable permanent magnet material in which case they have flat inner ends 35 to engage the seats 27, flat outer ends 36 to receive the pole pieces 22, flat parallel end walls 37 and flat parallel side walls 38. The several magnets are spaced somewhat apart on the core 20 and are supported by the seats 27 so they project radially from the core with the result that the side walls 38 of adjacent magnets diverge somewhat as clearly illustrated in Figs. 2 and 6 of the drawings. In practice the seats 27 may be slightly recessed into the outer periphery 26 of the core so that the inner ends of the magnets are, in effect, mortised or recessed into the core to be thereby positively spaced circumferentially of the core.

In accordance with the preferred form of my present invention there is a pole piece 22 on the outer end of each magnet 21 and each pole piece is in the form of a strip or length of magnetic material having an inner side or face 40 made to seat on the outer end 36 of a magnet and having an outer face 42 convex in form and preferably curved concentric with the axis of the rotor. In the form of the invention illustrated I employ two retainers 23 in which case I prefer to proportion each pole piece 22 so that its ends project beyond the magnets or from the end walls 37 of the magnets to carry or receive the retainers at points axially removed from the portions of the pole pieces opposite the outer ends of the magnets. To limit or restrict the size of the rotor I provide notches or recesses 43 in the upper outer corners of the pole pieces and the retainers are confined in or to the notched portions of the pole pieces. By notching the outer end portions of the pole pieces each pole piece is provided at each end with a projecting lip portion 44 engaged by a retainer 23 and the retainer may seat in the lips 44 so that their outer surfaces are slightly inward of the outer surface 42 of the pole piece.

Each pole piece 22 is made somewhat wider or of greater circumferential extent than the magnet on which it is mounted but adjacent pole pieces are spaced a substantial distance apart so that a spacer portion of body 24 occurs between adjacent pole pieces.

It is desirable in practice to provide damper bars in connection with pole pieces 22. In the preferred form of my invention I form each pole piece with a longitudinal opening 50 which accommodates a damper bar 25, which opening 50 is connected with the periphery of the pole piece by a radial channel 51 somewhat smaller than the opening 50 so that the damper bar is positively prevented from being displaced outwardly when the rotor is in operation. Further, in accordance with my invention a recess 55 is formed in each pole piece 22 from each end thereof to extend into the pole piece beyond or inward of the notches or recesses 43 in order to establish openings accommodating web portions 53 of body 24 which web portions effectively couple the ends of the damper bars 25 with the rings 54 of the body which occur at the ends of the rotor.

The retainers 23 are continuous annular bands of non-magnetic material applied to the lips 44 projecting from the ends of the pole pieces 22. The retainers are confined or recessed into the notches or recesses 43 at the projecting ends of the pole pieces so that they do not project radially beyond the outer peripheral surfaces 42 of the pole pieces and so that they are axially removed in either direction from the annular series of magnets 21 carried on the core 20. In practice there is preferably a single band or retainer at each end of the rotor construction and the bands are formed of suitable stainless steel or like material so that they do not conduct magnetism.

The several magnets 21 entering into the rotor are held tightly against the seats 27 on the core by the retainers 23 acting through the pole pieces 22, and the assembly thus formed has the body 24 cast to it so that all parts are bonded into a unit by the body, and the various voids or interstices occurring in the assembly are filled. The body includes generally complete annular bodies or rings 54 that occur at each end of the rotor opposite the assembly of parts above described, main webs 60 that join the rings and extend between the adjacent magnets 21, spacer parts 61 that project radially from the webs 60 to occur between adjacent pole pieces 22 and the web portions 53 that connect the rings 54 with the damper bars 25. When the damper bars 25 are cast as part of the body 24 as they may be the web portions 53 are integrally joined with the ends of the damper bars as shown in Fig. 4 of the drawings. In the preferred form of the invention the rings 54 of the body project axially somewhat beyond the ends of the pole pieces and outwardly projecting flange portions 66 project from the rings to overlie the outermost ends of the retainers to positively prevent displacement of the retainers from the lip portions of the pole pieces. The inner peripheral portions of the rings 54 of the body 24 occur at the ends of the core 20 with the result that the assembly of magnets is positively held against axial shifting on the core 20.

In accordance with the method that I have provided the rotor constructed as above described is formed by initially arranging the magnets 21 on the seats 27 with the pole pieces on the outer ends of the magnets. With the core, magnets and pole pieces assembled the retainer rings are expanded as by heat, whereupon they are arranged in place on the projecting lips of the pole pieces, the parts being proportioned so that the retainers when expanded fit snugly over the lips of the pole pieces while the pole pieces, magnets and core are tightly assembled. The retainers thus applied while expanded act to shrink or contract onto the lips of the pole pieces and thereby exert an inward force on the assembly maintaining the pole pieces and magnets tight on the core.

The body 24 is cast onto the assembly prepared as above described and for this operation the entire assembly is heated say to about 1000° F. and then the body is cast in place.

It is preferred in practice to place the heated assembly, including the core magnets, pole pieces and retainers, in a mold M and I prefer to rotate the mold about the axis of the rotor as the body 24 is being cast. In the drawings I show a mold M on a vertically disposed drive shaft 70 and the mold is shown as including a bottom 71 and a cylindrical side wall 72 projecting upwardly from the periphery of the bottom and a top plate 73 on the upper end of the side wall. The parts of the rotor prepared preliminary to casting of the body are fixed in the mold as by suitable fastening devices 75 and a suitable plug 76 is arranged in the rotor parts to direct the body material outward in the desired manner. The bottom 71 of the mold has an upwardly projecting inner flange 77 which engages the assembly of rotor parts to confine the body material in the desired manner. In practice I may employ suitable spacer pins 78 and 79 to adjust the rotor assembly in the mold body and to hold the rotor parts in their respective positions.

With the core parts assembled in the mold the shaft 70 is rotated at a suitable speed, say about 1000 R. P. M. whereupon molten non-magnetic material such as aluminum or aluminum alloy is poured into the mold to form the various body parts above described as a single casting embracing the other parts of the rotor. When the casting has been made the assembly is removed from the mold and the excess portions of the body and pole pieces are turned or dressed away leaving only the desired body parts above described.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A rotor of the character described including, a core, a plurality of magnets seated on the core and projecting radially therefrom, pole pieces seated on the outer ends of the magnets and each having notched axially projecting lips, and retaining bands engaged around the lips of the pole pieces holding the pole pieces in pressure engagement with the magnets.

2. A rotor of the character described including, a core, a plurality of magnets seated on the core and projecting radially therefrom, pole pieces seated on the outer ends of the magnets and each having a projecting lip, a retaining band engaging the lips of the pole pieces holding the pole pieces in pressure engagement with the magnets, and a body embracing the magnets and pole pieces and retaining the band on the lips.

3. A rotor of the character described including, a core, a plurality of magnets seated on the core and projecting radially therefrom, pole pieces seated on the outer ends of the magnets and each having a projecting lip, a retaining band engaging the lips of the pole pieces holding the pole pieces in pressure engagement with the magnets, a body embracing the magnets and pole pieces and retaining the band on the lips, and damper bars at the pole pieces electrically coupled to the body.

4. A rotor of the character described including, an annular core of magnetic material having seats on its outer periphery, magnets on the seats projecting radially from the core, a pole piece on the outer end of each magnet having end portions projecting axially from the magnet, said end portions having their outer corners notched to form lips, each pole piece having an opening through it from one end portion to the other, annular retaining bands concentric with the axis of the rotor and bearing radially inward on the lips, and a body with rings at each end of the rotor joined by webs engaged between the magnets and having spacer parts projecting from the webs and located between adjacent pole pieces, the body also having damper portions occupying the openings in the pole pieces and electrically coupled to the other portions of the body, the rings of the body engaging the bands retaining them on the lips.

MAURICE W. BRAINARD.

REFERENCES CITED

The following references are of record in the file of this patent:

UNITED STATES PATENTS

| Number | Name | Date |
|---|---|---|
| 1,991,046 | Bohli | Feb. 12, 1935 |
| 2,000,715 | Penney | May 7, 1935 |
| 2,059,518 | Harley | Nov. 3, 1936 |
| 2,125,970 | Waters | Aug. 9, 1938 |
| 2,209,334 | Jungk | July 30, 1940 |
| 2,248,167 | Elsey | July 8, 1941 |
| 2,303,893 | Mullner | Dec. 1, 1942 |
| 2,418,980 | Morrill | Apr. 15, 1947 |

FOREIGN PATENTS

| Number | Country | Date |
|---|---|---|
| 459,295 | Great Britain | Jan. 5, 1937 |